C. HANSON.
AUXILIARY LINK AND CHAIN FASTENER.
APPLICATION FILED MAY 23, 1921.
1,408,998. Patented Mar. 7, 1922.
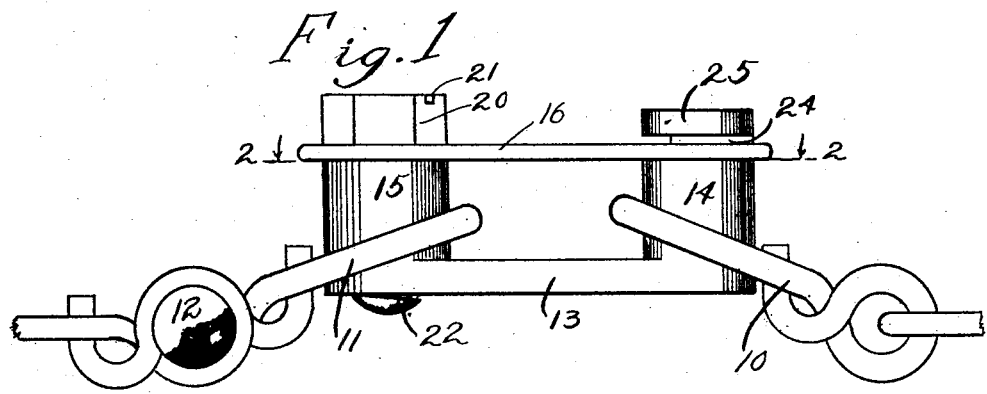
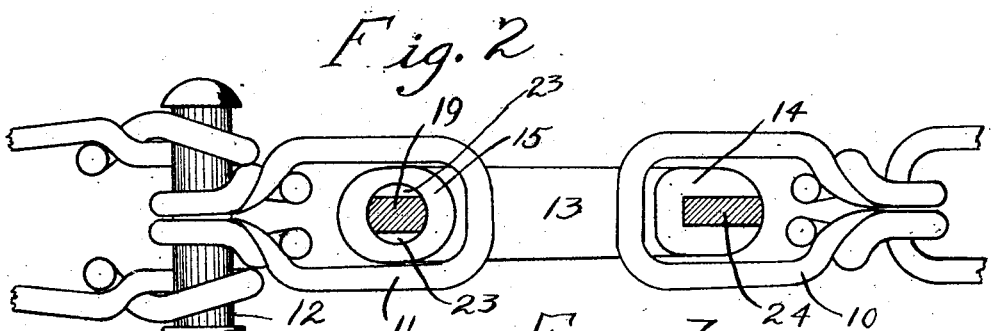
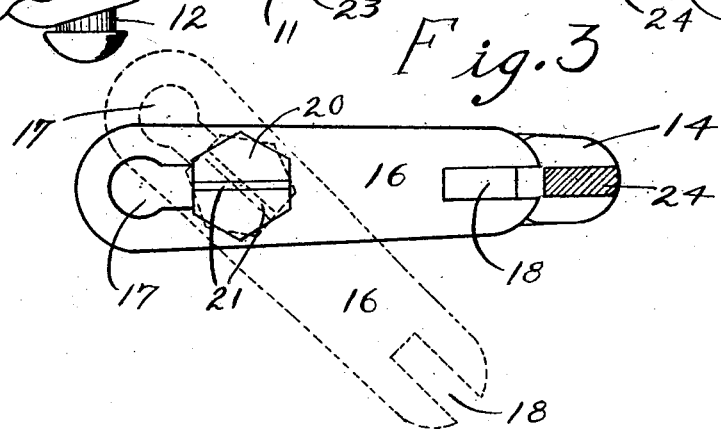
Witness
Fred Latta
Inventor
Chris Hanson
By Bair & Freeman
Attorneys

UNITED STATES PATENT OFFICE.

CHRIS HANSON, OF FORT DODGE, IOWA.

AUXILIARY LINK AND CHAIN FASTENER.

1,408,998.   Specification of Letters Patent.   Patented Mar. 7, 1922.

Application filed May 23, 1921. Serial No. 471,896.

*To all whom it may concern:*

Be it known that I, CHRIS HANSON, a citizen of the United States, and a resident of Fort Dodge, in the county of Webster and State of Iowa, have invented a certain new and useful Auxiliary Link and Chain Fastener, of which the following is a specification.

The object of my invention is to provide an auxiliary link and chain fastener of simple, durable and inexpensive construction.

More particularly my invention relates to a link for securing the two ends of a chain together and for holding them against undesired movement, the parts being so arranged that the link fastener may be quickly and easily removed when desired.

Still another object is to provide a link fastener having a pair of projections formed thereon for engaging the end links of a chain, and a movable locking bar which is capable of sliding and rotary movement for permitting the end of the chain to be unfastened when it is desired, and also adapted when in another of its positions to prevent the chain from becoming unfastened.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my improved auxiliary link and chain fastener with the ends of a chain secured thereto, the figure being enlarged for clearly illustrating the parts.

Figure 2 is a sectional view taken on line 2—2 of Figure 1 showing how the locking bar may be operated; and Figure 3 is a view showing the locking bar in one of its moved positions in solid lines, and in another of its moved positions shown in dotted lines, parts being shown in section to better illustrate the construction.

My link fastener is preferably designed to be used for fastening the ends of a non skid chain together for use on automobile wheels.

In the accompanying drawings I have used the reference numerals 10 and 11 to indicate the ends of an ordinary non skid chain or the like with the links of the chain being of the ordinary construction.

However, the end 11 of the chain is fixed to the adjacent link by means of a pintle rod 12.

The purpose of reversing the end 11 of the chain is to make it possible to have both ends of the chain free so that they may be secured to my improved link fastener.

My improved link fastener comprises a member 13 having a pair of projections 14 and 15 formed thereon at its ends. The ends 10 and 11 of the chain are extended over the projecting portions 14 and 15 on the member 13.

In order to securely hold the ends 10 and 11 to the fastening member I provide a locking bar or plate 16 which is provided with a key hole slot 17 at one end and a notch 18 at its opposite end.

Rotatably mounted within the projecting portion 15 is a bolt member 19 having a head 20 thereon and a notch 21 in its head so that it may be engaged by a screw driver if desired.

The bolt 19 extends through the projecting portion 15 and has its lower end battered as at 22. The bolt 20 is not provided with any screw threads and is held against free rotation within the projecting portion by the battered portion 22 thereof.

The bolt 19 is provided with a pair of notches 23 in its sides. A portion of the edge of the key hole slot 17 is received within the notches 23.

When the enlarged or circular portion of the key hole slot 17 is moved to position where it registers with the bolt 19 then the locking bar 16 is capable of pivotal movement relative to the bolt 19.

When the contracted or narrower portion of the key hole slot 17 is received in the notches 23 then the locking bar 16 is capable of only longitudinal or sliding movement.

The projecting portion 14 is provided between its ends with a contracted portion 24 which is of substantially the same width as the notch 18. The forming of the contracted portion 24 causes the head 25 to be formed on the projecting portion 15.

The locking bar 16 may be slid longitudinally so that the notch 18 receives the contracted portion 24 and the end of the locking bar 16 is received below the head 25 and the projecting portion 14.

When in this position the enlarged portion of the key hole slot 17 will receive the bolt 19.

The bolt 19 may then be rotated so that the notches 23 will no longer register with the contracted portion of the slot and thus prevent any longitudinal movement of the locking bar.

Pivotal movement will be prevented by the fact that the end of the locking bar 16 will be engaged by the contracted portion 24.

From the construction of the parts just described it will be seen that after the ends 10 and 11 of the chain have been positioned over the projecting portions 14 and 15 and the locking bar moved to operative position, shown in Figure 1, that the ends of the chain will be securely held against undesired movement.

When the notch 21 is moved to position as shown in solid lines in Figure 3 of the drawings it indicates that the narrower portion of the slot 17 will register with the notches 23 in the bolt for permitting the sliding movement of the locking bar.

When the locking bar has been moved to the position shown by the solid lines in Figure 3, the end adjacent to the notch 18 will be clear of the contracted portion 24.

Further rotation of the bolt 19 will then cause the locking bar 16 to be moved therewith. This makes it possible to remove or secure the chain to the fastener.

To lock the locking bar in position the parts are moved from the position shown in dotted lines in Figure 3, to the position shown in solid lines in Figure 3.

The locking bar is then slid longitudinally until the notch 18 receives the portion 24. The bolt 19 is then rotated slightly so that the notches 23 no longer register with the narrower portion of the slot 17.

This prevents any longitudinal movement of the locking bar while rotary movement is prevented by the portion 24 which is in engagement with one end of the locking bar.

It will be seen that I have provided a very efficient chain fastener which is of very simple construction, and is easily operated.

It will be understood that in fastening the ends of a non skid chain around the tire any type of device may be used for pulling the device close together while the fastener is being placed in position for holding the ends together.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A fastening link for chains comprising a body member having a pair of projecting portions formed at its ends, said projecting portions each being designed to have the ends of a chain placed there over, a locking bar slidably and rotatably mounted on one of said projections and means on the other projecting portion for engaging one end of the locking bar as and for the purposes stated.

2. A fastening link for chains comprising a body member having a pair of projecting portions formed at its ends, said projecting portions each being designed to have the ends of a chain placed there over, a locking bar slidably and rotatably mounted on one of said projections, said locking bar having a notch formed in its free end, a contracted portion formed on the other of said projecting portions, said notch being designed to receive said contracted portion for holding said locking bar against rotary movement for the purposes stated.

3. A fastening link for chains comprising a body member having a pair of projecting portions formed at its ends, said projecting portions each being designed to have the ends of a chain placed there over, a locking bar slidably and rotatably mounted on one of said projections and means on the other projecting portion for engaging one end of the locking bar for preventing its rotary movement, but permitting its sliding movement, as and for the purposes stated.

4. A fastening link for chains comprising a body member having a pair of projecting portions formed at its ends, said projecting portions each being designed to have the ends of a chain placed there over, a locking bar, said locking bar being secured to one of said projecting portions, a bolt member extended through said last projecting portion and through one end of said locking bolt, said locking bar being capable of sliding and rotary movement relative to said bolt, the free end of said locking bar having a notch therein adapted to co-act with one of the projecting portions for preventing the rotary movement of said locking bar as and for the purposes stated.

5. A fastening link for chains comprising a member having projecting portions formed at its ends, each of said projecting portions being designed to have a link of a chain extended thereover, a locking bar for holding said links against removal from said projecting portions, said locking bar being pivotally secured to one end of one of said projecting portions and means formed on the other projecting portion for engaging said locking bar for preventing its free pivotal movement.

6. A fastening link for chains comprising a member having projecting portions formed at its ends, each of said projecting portions being designed to have a link of a chain extended thereover, a locking bar for holding said links against removal from said projecting portions, said locking bar being provided with a key hole slot near one end thereof and a notch at its other end a bolt extended through one of said projecting portions, said bolt having opposite notches formed therein, the parts being so arranged that said locking bar may be slid longitudinally when the notches in the bolt register with a portion of the slot and rotated when the bolt registers with another portion of the slot, the notches in said locking bar being designed to co-act with one of said projecting portions as and for the purposes stated.

7. A fastening link for chains comprising a member having projecting portions formed at its ends, each of said projecting portions being designed to have a link of a chain extended thereover, a locking bar for holding said links against removal from said projecting portions, said locking bar being provided with a key hole slot near one end thereof, a bolt extended through one of said projecting portions, said bolt having opposite notches formed therein, the parts being so arranged that the bolt may be rotated to a certain position whereby movement of the locking bar longitudinally or pivotally will be prevented.

8. A fastening link for chains comprising a member having projecting portions formed at its ends, each of said projecting portions being designed to have a link of a chain extended thereover, a locking bar for holding said links against removal from said projecting portions, said locking bar being provided with a key hole slot near one end thereof, a bolt extended through one of said projecting portions, said bolt having opposite notches formed therein, the parts being so arranged that the bolt may be rotated to a certain position whereby movement of the locking bar longitudinally only will be permitted.

Des Moines, Iowa, May 12th, 1921.

CHRIS HANSON.